(12) United States Patent
Chen et al.

(10) Patent No.: US 8,121,018 B2
(45) Date of Patent: Feb. 21, 2012

(54) SIGNAL TRANSMITTING METHOD, SIGNAL RECEIVING METHOD AND SIGNAL RECEIVING DEVICE IN OFDM SYSTEM

(75) Inventors: Chao-Wei Chen, Taipei (TW);
Shyue-Win Wei, Hsinchu (TW);
Hsin-An Hou, Taipei County (TW);
Harmoko Habibi Roni, Nantou County, ID (US)

(73) Assignees: Industrial Technology Research Institute, Hsin-Chu (TW); National Chi Nan University, Nantou County (TW)

( * ) Notice: Subject to any disclaimer, the term of this patent is extended or adjusted under 35 U.S.C. 154(b) by 301 days.

(21) Appl. No.: 12/554,387

(22) Filed: Sep. 4, 2009

(65) Prior Publication Data
US 2010/0315940 A1    Dec. 16, 2010

(30) Foreign Application Priority Data
Jun. 12, 2009   (TW) ................................ 98119840 A

(51) Int. Cl.
*H04J 11/00* (2006.01)
*H04J 9/00* (2006.01)
*H04L 5/04* (2006.01)
(52) U.S. Cl. ........ 370/203; 370/204; 370/205; 370/206; 370/207; 370/208; 370/209; 370/210; 370/211; 375/130
(58) Field of Classification Search .......... 370/203–211, 370/430; 375/130, 259–260, 268
See application file for complete search history.

(56) References Cited

U.S. PATENT DOCUMENTS

| | | | | |
|---|---|---|---|---|
| 7,394,865 | B2 * | 7/2008 | Borran et al. .................. | 375/295 |
| 7,660,229 | B2 * | 2/2010 | Papasakellariou et al. ... | 370/203 |
| 7,957,476 | B2 * | 6/2011 | Sanada et al. ................. | 375/260 |
| 8,014,264 | B2 * | 9/2011 | Li et al. ......................... | 370/203 |
| 2004/0190637 | A1 * | 9/2004 | Maltsev et al. ............... | 375/260 |
| 2004/0259514 | A1 * | 12/2004 | Nissila ........................ | 455/226.1 |
| 2004/0264585 | A1 * | 12/2004 | Borran et al. ................. | 375/260 |

(Continued)

OTHER PUBLICATIONS

"Low-Complexity Equalisation Methods for OFDM Systems in Doubly Selective Channels"; Muralidhar, K.; Li Kwok Hung; Ying Chang Liang; Vehicular Technology Conference, 2008. VTC Spring 2008. IEEE. May 11-14, 2008. ISBN: 978-1-4244-1644-8.*

Mostofi et al., ICI Mitigation for Pilot-Aided OFDM Mobile Systems, IEEE Transactions on Wireless Communications, 2005, pp. 765-774, vol. 4, No. 2.

(Continued)

*Primary Examiner* — Aung S Moe
*Assistant Examiner* — Benjamin H Elliott, IV
(74) *Attorney, Agent, or Firm* — Morris Manning & Martin LLP; Tim Tingkang Xia, Esq.

(57) ABSTRACT

A signal transmitting method, a signal receiving method, and a signal receiving device are adapted to an OFDM system. In the signal transmitting method and signal receiving method, double asymmetric training symbols are used for performing time-varying channel response estimation. In the transmitting method, asymmetric pilot sub-carriers are added in data sub-carriers to form a plurality of first and second training symbols. The pilot symbols in the first and second training symbols are asymmetrically configured. In the receiving method, a channel response corresponding to each pilot sub-carrier is estimated by using two adjacent asymmetric pilot symbols. The received data sub-carrier is then restored through the channel response. Through the signal transmitting method and signal receiving method, even in a transmitter or a receiver moving at a high speed, more bandwidths can be used to transfer data, and contents of the transferred data can be correctly estimated.

15 Claims, 10 Drawing Sheets

U.S. PATENT DOCUMENTS

| | | | |
|---|---|---|---|
| 2005/0180461 A1* | 8/2005 | Kao et al. | 370/480 |
| 2006/0171488 A1* | 8/2006 | Rosenlof et al. | 375/340 |
| 2006/0252386 A1* | 11/2006 | Boer et al. | 455/101 |
| 2007/0217546 A1* | 9/2007 | Sandell et al. | 375/299 |
| 2007/0217615 A1* | 9/2007 | Rajagopal et al. | 381/15 |
| 2008/0219339 A1* | 9/2008 | Chrabieh et al. | 375/231 |
| 2009/0296839 A1* | 12/2009 | Stadelmeier et al. | 375/260 |
| 2010/0067366 A1* | 3/2010 | Nicoli | 370/210 |
| 2010/0080312 A1* | 4/2010 | Moffatt et al. | 375/260 |
| 2010/0091898 A1* | 4/2010 | Muralidhar et al. | 375/260 |
| 2010/0098198 A1* | 4/2010 | Muralidhar et al. | 375/346 |
| 2010/0315940 A1* | 12/2010 | Chen et al. | 370/210 |

OTHER PUBLICATIONS

H.S. Cho, Midamble aided OFDM performance analysis in high mobility vehicular channel, 2008, 14 slides.

Chen et al., Intercarrier interference suppression and channel estimation for OFDM systems in time-varying frequency selective fading channels, IEEE Trans. Consum. Electron., May 2004, pp. 429-435, vol. 50, No. 2.

Lee et al., Matrix Channel Estimation for OFDM Systems with Two Training Symbols and High-Order Polynomial Fitting, in Proc. 18th Annu. IEEE Int'l Symp. on Personal, Indoor and Mobile Radio Communications, Sep. 2007, pp. 1-5, Athens, Greece.

* cited by examiner ns, Greece, September 2007, pp. 1-5).
SIGNAL TRANSMITTING METHOD, SIGNAL RECEIVING METHOD AND SIGNAL RECEIVING DEVICE IN OFDM SYSTEM

CROSS-REFERENCE TO RELATED APPLICATIONS

This non-provisional application claims priority under 35 U.S.C. §119(a) on Patent Application No(s). 098119840 filed in Taiwan, R.O.C. on Jun. 12, 2009, the entire contents of which are hereby incorporated by reference.

TECHNICAL FIELD

The present invention relates to a signal transmitting method, a signal receiving method, and a signal receiving device applied in an orthogonal frequency-division multiplexing (OFDM) system.

BACKGROUND

An OFDM system is a frequency-division multiplexing (FDM) system using digital multi-carrier modulation. A plurality of orthogonal sub-carriers is used to transfer data. The data are divided into a plurality of parallel data streams or channels corresponding to the sub-carriers respectively. Each sub-carrier carries a single symbol, each symbol corresponds to several sets of bits, and each symbol of 16 quadrature amplitude modulation (QAM) corresponds to 4 bits. Corresponding manners include, for example, QAM or phase shift modulation, which is also referred to as phase shift keying (PSK).

The OFDM technology is usually applied in the field of wireless communication, which possibly generates a multi-path effect. The multi-path effect may cause time-spreading and inter-symbol interference (ISI). This is a so-called frequency-selective channel. The frequency-selectivity is generally overcome by adding a guard interval in each OFDM symbol.

When a transmitter and a receiver of the broadband mobile communication applying an OFDM technology are respectively located in a base station and a vehicle moving at a high speed (for example, an express train), relative movement there-between may generate Doppler Effect. The Doppler Effect may cause a channel response in a transferred OFDM symbol to become time-varying. That is a so-called time-selective channel. Orthogonality between the sub-carriers is further damaged, which is called an inter-carrier interference (ICI). The faster the vehicle moves, the more apparent the ICI will be.

A common approach for eliminating the ISI is to add a guard interval in each OFDM symbol, which may prolong a symbol period. However, the longer the symbol period is, the greater the influences of the Doppler Effect will be. Therefore, in order to eliminate the wireless channel time-varying and frequency-selective effects that the broadband mobile communication encounters during a high speed movement, a channel estimation technology is usually utilized.

In addition, the channel estimation technology may also be obtained with reference to the following documents:

(i) an article published by S. Chen and T. Yao (S. Chen and T. Yao, "Intercarrier interference suppression and channel estimation for OFDM systems in time-varying frequency selective fading channels," IEEE Trans. Consum. Electron., vol. 50, no. 2, pp. 429-435, May 2004.);

(ii) an article published by Y. Mostofi and D. C. Cox (Y. Mostofi and D. C. Cox, "ICI mitigation for pilot-aided OFDM mobile systems," IEEE Trans. Wireless Commun., vol. 4, no. 2, pp. 765-774, March 2005);

(iii) an article published by H. S. Cho (H. S. Cho, "Midamble aided OFDM performance analysis in high mobility vehicular channel," 802.11 WLAN WG, Jan. 14, 2008); and (iv) an article published by H. C. Lee, C. W. Chen, S. M. Young, and Shyue-Win Wei (H. C. Lee, C. W. Chen, S. M. Young, and Shyue-Win Wei, "Matrix Channel Estimation for OFDM Systems with Two Training Symbols and High-Order Polynomial Fitting," In Proc. 18th Annu. IEEE Int'l Symp. on Personal, Indoor and Mobile Radio Communications, Athens, Greece, September 2007, pp. 1-5).

The accuracy of time-varying channel estimation may influence performance of an OFDM frequency domain equalizer or signal detection performance, which further influences the accuracy for demodulating transferred signals. Therefore, the quality of the channel estimation technology directly influences performance of the whole OFDM system.

SUMMARY

In an embodiment, the present disclosure provides a signal transmitting method in an OFDM system. The signal transmitting method is performed by a transmitter of the OFDM system. The signal transmitting method comprises: receiving and converting a serial digital signal into a plurality of OFDM symbols (or referred to as parallel sub-carriers $X_i(k)$); transforming the OFDM symbols into a plurality of time domain signals $x(k)$; and serializing the time domain signals into a transmitted signal and then transmitting the signal. The OFDM symbols comprise a plurality of data symbols, a plurality of first training symbols, and a plurality of second training symbols. The above symbols comprise a plurality of data sub-carriers, a plurality of first pilot sub-carriers, and a plurality of second pilot sub-carriers. The data symbols comprise the data sub-carriers. The first training symbols comprise the first pilot sub-carriers. The second training symbols comprise the second pilot sub-carriers and the data sub-carriers. That is to say, active sub-carriers of the data symbols are all data sub-carriers. Active sub-carriers of the first training symbols are all first pilot sub-carriers. Active sub-carriers of the second training symbols are all second pilot sub-carriers and data sub-carriers.

In an embodiment, the present disclosure further provides a signal receiving method, suitable for receiving transmitted signals transmitted through the signal transmitting method. The signal receiving method is performed by a receiver of the OFDM system. The transmitted signal is transferred to the receiver through a plurality of paths to become a receiving signal with a channel response. The signal receiving method comprises: receiving and converting the receiving signal with a channel response into a frequency-domain serial signal, in which the frequency-domain serial signal comprises a plurality of data receiving signals, a plurality of first pilot receiving signals, and a plurality of second pilot receiving signals; estimating channel responses on the data receiving signals by using the adjacent first pilot receiving signals and second pilot receiving signals; and restoring the data receiving signals into data sub-carriers by using the channel responses.

In an embodiment, the present disclosure further provides a receiver in an OFDM system, suitable for receiving transmitted signals transmitted through the signal transmitting method. The receiver comprises an OFDM demodulator and an inter-subcarrier interference cancellation unit. The OFDM demodulator receives and demodulates a receiving signal with a channel response to a frequency-domain serial signal. The frequency-domain serial signal comprises a plurality of data receiving signals, a plurality of first training receiving signals, and a plurality of second training receiving signals. The inter-subcarrier interference cancellation unit estimates a plurality of channel responses by using the adjacent first pilot receiving signals and second pilot receiving signals, and restores the data receiving signals into data sub-carriers by using the channel responses.

BRIEF DESCRIPTION OF THE DRAWINGS

The present invention will become more fully understood from the detailed description given herein below for illustration only, and thus is not limitative of the present invention, and wherein.

DETAILED DESCRIPTION

The above brief description of the contents of the embodiments and the following detailed description of the embodiments are used to illustrate and explain the spirit and principle of the present invention, and provide further explanations of the claims of the present invention.

Figure 1:
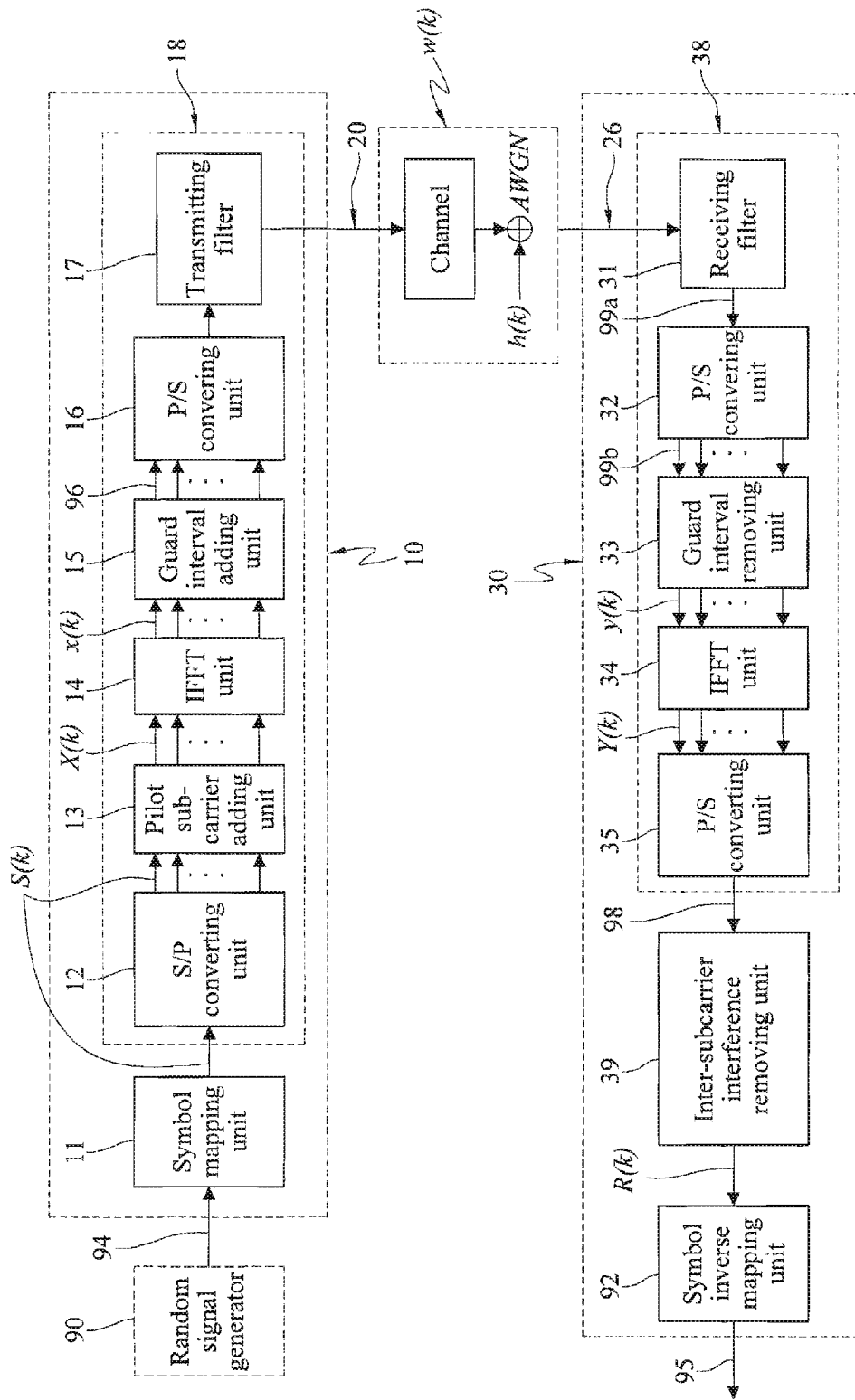
FIG. 1 is a schematic structural view of a transmitter and a receiver of an OFDM system according to an embodiment.

FIG. 1 is a schematic structural view of a transmitter 10 and a receiver 30 in an OFDM system according to an embodiment. The OFDM system comprises a transmitter 10 and a receiver 30. The transmitter 10 is used for performing an embodiment of a signal transmitting method. The receiver 30 is used for performing an embodiment of a signal receiving method. The transmitter is used for converting a serial digital signal 94 into a transmitted signal 20 (also referred to as a radio frequency signal) and then transmitting the transmitted signal 20. After being transmitted, the transmitted signal 20 reaches the receiver 30 through different paths. At this time, a signal 26 received by the receiver 30 is the transmitted signal 20 comprising a channel impulse response h(k) and a noise w(k) (hereinafter briefly referred to as a receiving signal with a channel response). The receiver 30 converts the receiving signal 26 with a channel response into the restored serial digital signal 95.

The serial digital signal 95 is a serial digital signal 94 formed by data to be transferred. As seen from FIG. 1, the serial digital signal 94 is generated by a random signal generator 90. In practical implementation, the serial digital signal 94 is not generated by the random signal generator 90, but directly formed by the data to be transferred. The random signal generator 90 shown in the figure aims at illustrating the generation of the serial digital signal 94 and tests the embodiment, and it is not intended to limit the implementation.

The serial digital signal 94 generated by the random signal generator 90 may be, but not limited to, PRBS $2^7-1$, $2^{23}-1$ (pseudo random binary sequence), and the like. The pseudo random binary sequence is adapted to simulate various possible serial digital signals 94.

As seen from FIG. 1, the transmitter 10 comprises a symbol mapping unit 11 and an OFDM modulator 18.

The symbol mapping unit 11 receives the serial digital signal 94, divides the serial digital signal 94 into a plurality of sets of bits with a predetermined length, and maps the sets of bits one by one into a plurality of serial data sub-carriers S(k). The sets of bits may be respectively formed by two, four, six, eight, ten or more bits. Although the above sets of bits respectively comprise, for example, even-numbered bits, they may also comprise odd-numbered bits. The data sub-carriers S(k) generated by the symbol mapping unit 11 are still serial data.

The OFDM modulator 18 comprises a serial to parallel converting unit (S/P converting unit) 12, a pilot sub-carrier insertion unit 13, an inverse fast Fourier transforming (IFFT) unit 14, a guard interval adding unit 15, a parallel to serial converting unit (P/S converting unit) 16, and a transmitting filter 17.

The S/P converting unit 12 receives the serial data sub-carriers (k), and converts the serial data sub-carriers (k) into parallel data sub-carriers S(k).

The pilot sub-carrier insertion unit 13 receives the parallel data sub-carriers S(k), and then arranges/inserts "pilot sub-carriers" between "data sub-carriers" in a suitable manner. The "data sub-carriers" and the suitably-configured "pilot sub-carriers" are combined into a plurality of OFDM symbols Xi(k) (also referred to as a plurality of parallel active sub-carriers). That is to say, all the parallel active sub-carriers Xi(k) comprise a plurality of "data sub-carriers" and a plurality of "pilot sub-carriers". The OFDM symbols Xi(k) are frequency domain signals.

Figure 3:
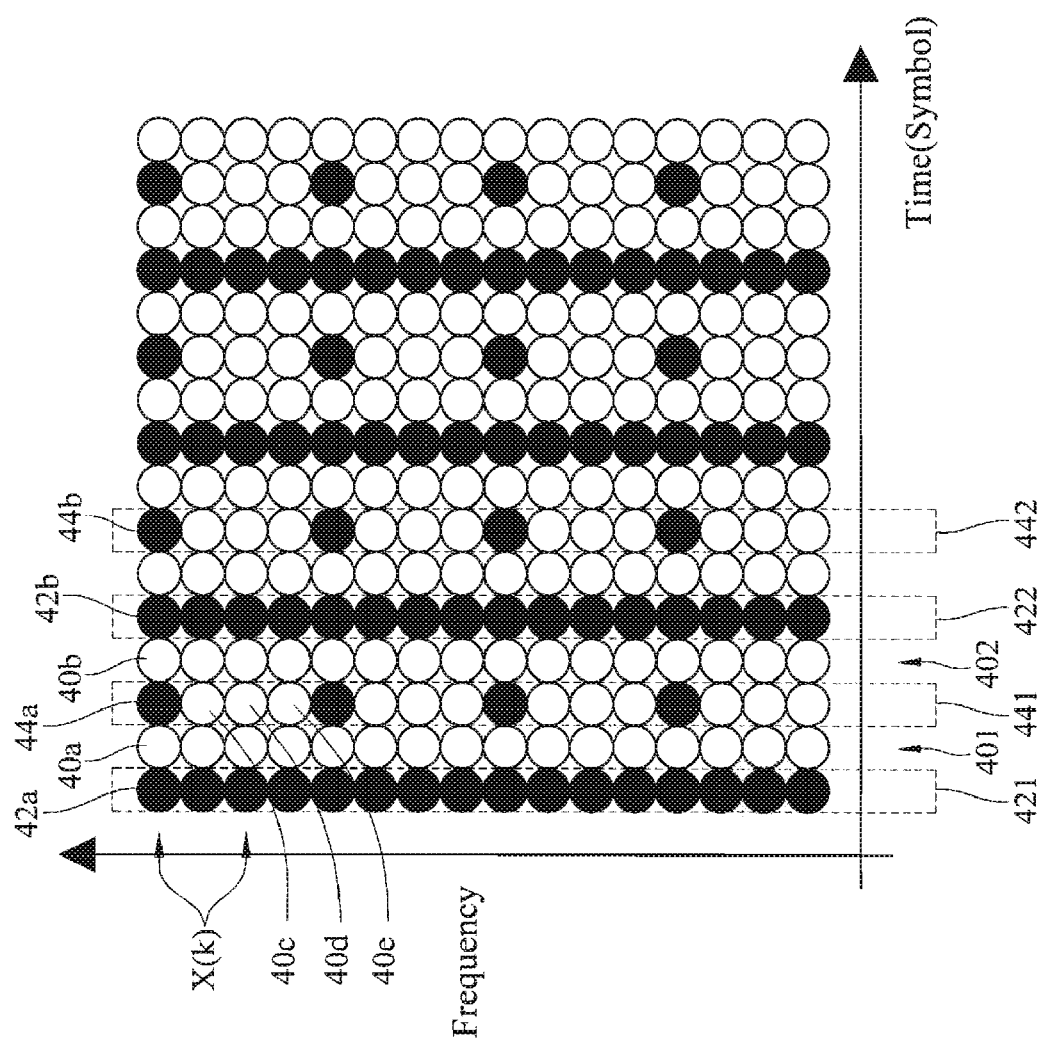
FIG. 3 is a schematic view of configuring pilot sub-carriers to data sub-carriers through the signal transmitting method according to an embodiment.

Referring to FIG. 3, the manner of configuring the "pilot sub-carriers" between the "data sub-carriers" is shown.

In FIG. 3, the transverse axis is time, in which the unit thereof is symbol, and the longitudinal axis is frequency. As seen from FIG. 3, 16 dots exist on each vertical column. Each vertical column is referred to as one symbol. Each dot represents one sub-carrier. For the example shown in the figure, each symbol has 16 sub-carriers, or referred to as active sub-carriers. The active sub-carriers may be "pilot sub-carriers" or "data sub-carriers". In the figure, the solid dots represent pilot sub-carriers. The soft dots represent data sub-carriers. The symbols comprise a plurality of data symbols 401 and 402, a plurality of first training symbols 421 and 422, and a plurality of second training symbols 441 and 442. As seen from the sub-carriers in each symbol, the symbols comprise a plurality of data sub-carriers 40a, 40b, 40c, 40d, and 40e, a plurality of first pilot sub-carriers 42a and 42b, and a plurality of second pilot sub-carriers 44a and 44b.

The active sub-carriers (also referred to as each of the parallel sub-carriers X(k)) in the data symbols 401, 402 all use the data sub-carriers 40a, 40b. The active sub-carriers in the first training symbols 421, 422 all use the first pilot sub-carriers 42a, 42b. The active sub-carriers of the second training symbols 441, 442 are formed by the second pilot sub-carriers 44a, 44b and the data sub-carriers 40c, 40d, and 40e. The number of the second pilot sub-carriers 44a, 44b of the second training symbols 441, 442 is smaller than that of the active sub-carriers of the second training symbols 441, 442.

As seen from the schematic view of the second training symbols 441 and 442 in FIG. 3, one second pilot sub-carrier 44a, 44b exists for each four adjacent active sub-carriers. That is to say, the number of the second pilot sub-carriers 44a, 44b of the second training symbols 441, 442 is a quarter of that of the active sub-carriers X(k) of the second training symbols 441, 442. That is to say, the number of the second pilot sub-carriers 44a, 44b of the second training symbols 441, 442 is one third of the number of the data sub-carriers 40c, 40d, and 40e of the second training symbols 441, 442. Although in this embodiment, the configuration is performed in a ratio of 1:4 (pilot sub-carriers to active sub-carriers), in practical implementation, it may be configured in a ratio such as ½, or ⅛, which may be optionally adjusted by applied environment condition, e.g. coherent bandwidth. A frequency spacing between the adjacent second pilot sub-carriers 44a, 44b in the second training symbols 441, 442 is smaller than a coherent bandwidth.

Adjacent training symbols represents first training symbols 421, 422 and second training symbols 441, 442. For example, 421 and 441 may be referred to as adjacent training symbols. 441 and 422 are also referred to as adjacent training symbols.

As discussed above, the second pilot sub-carriers 44a, 44b of the second training symbols 441, 442 and the first pilot sub-carriers 42a, 42b of the first training symbols 421, 422 are distributed in the training symbols 441, 442, 421, and 422 in different manners. As seen from FIG. 3, the second pilot sub-carriers 44a, 44b of the first training symbol 421 and the first pilot sub-carriers 42a, 42b of the second training symbol 441 are distributed within the corresponding symbol in an asymmetric status. This is referred to as an asymmetric training symbol method or an asymmetric pilot symbol method. After being received by the receiver 30, such training symbols 421, 422, 441, and 442 are used to evaluate the time-varying channel response. As the second pilot sub-carriers 44a, 44b of the second training symbols 441, 442 do not occupy all the active sub-carriers X(k) corresponding to the same symbol interval, the other active sub-carriers (that is, data sub-carriers 40c, 40d, and 40e) corresponding to the symbol interval may be used to transfer data. In such a manner, the bandwidth for transferring data may be increased, and meanwhile, the bandwidth occupied by the pilot sub-carriers is decreased.

As seen from FIG. 3, the time duration of the data symbols 401, 402 between the first training symbols 421, 422 and the second training symbols 441, 442 is only one symbol duration, which is not intended to limit the implementation manner. On the time axis, the data symbols 401, 402 between the adjacent first training symbols 421, 422 and second training symbols 441, 442 may be two, three, four or more symbol durations (that is, symbol intervals), as long as the accuracy for evaluating the time-varying channel response carried out after the symbols are received at the receiver 30 can achieve a predetermined effect.

Next, the IFFT unit 14 is used for transforming the OFDM symbols X(k) into parallel first time domain signals x(k) in an IFFT manner. The first time domain signals x(k) are orthogonal with respect to each other. Subsequently, the guard interval adding unit 15 is used for copying a specific time duration of each first time domain signal x(k) to a position before or after the first time domain signal in a unit of a symbol, so as to become second time domain signals 96. The guard intervals added by the guard interval adding unit 15 may be cyclic prefix or cyclic post-fix. Taking the addition of the cyclic prefixes as an example, it is assumed that the duration of each symbol is 128 dots (the duration of 128 dots is a size of the IFFT unit 14, that is, an IFFT size), and if the copied rear signals are 40 dots, the guard interval adding unit 15 copies signals of the symbol at the last 40 dots on the time axis to the foremost part of the symbol. That is to say, after the copying process, the length of each symbol becomes 168 dots.

Subsequently, the P/S converting unit 16 is used for serializing the parallel second time domain signals 96 and transmitting the serialized second time domain signal 96 to the transmitting filter 17. The transmitting filter 17 filters the serialized second time domain signal 96 and transmit it as a transmitted signal 20.

Figure 2:
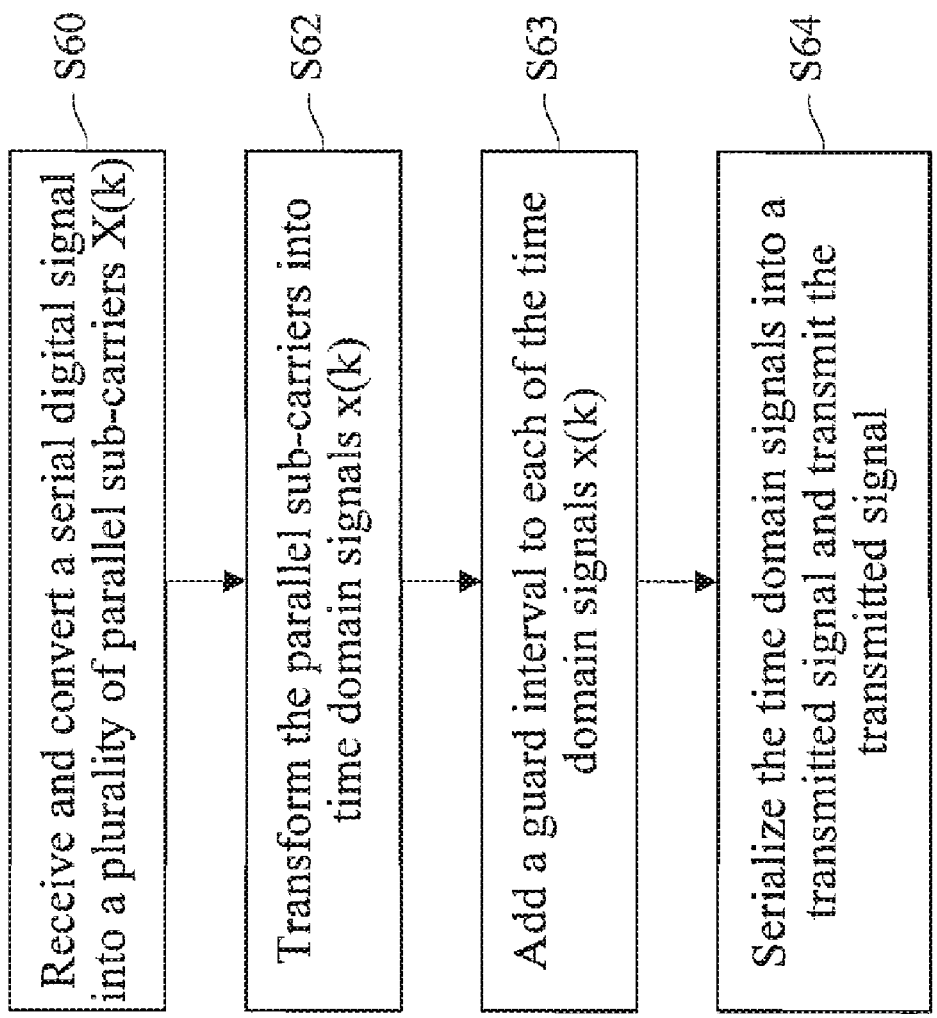
FIG. 2 is a schematic flow chart of a signal transmitting method in an OFDM system according to an embodiment.

FIG. 2 is a schematic flow chart of a signal transmitting method according to an embodiment of the present invention. The transmitting end 10 performs the embodiment of the signal transmitting method. The signal transmitting method comprises the following steps.

In Step S60, a serial digital signal 94 is received and converted into a plurality of OFDM symbols X(k). The OFDM symbols X(k) comprise a plurality of data symbols 401 and 402, a plurality of first training symbols 421 and 422, and a plurality of second training symbols 441 and 442. The symbols 401, 402, 421, 422, 441, and 442 comprise a plurality of data sub-carriers 40a, 40b, 40c, 40d, and 40e, a plurality of first pilot sub-carriers 42a and 42b, and a plurality of second pilot sub-carriers 44a and 44b. The data symbols 401 and 402 comprise the data sub-carriers 40a and 40b. The first training symbols 421 and 422 comprise the first pilot sub-carriers 42a and 42b. The second training symbols 441 and 442 comprise the second pilot sub-carriers 44a and 44b and the data sub-carriers 40c, 40d, and 40e.

In Step S62, the OFDM symbols are transformed into a plurality of time domain signals x(k).

In Step S64, the time domain signals are serialized into a transmitted signal for being transmitted.

Step S60 is accomplished by the symbol mapping unit 11, the S/P converting unit 12, and the pilot sub-carrier insertion unit 13 in FIG. 1. In Step S60, the serial digital signal 94 is converted into OFDM symbols X(k), that is, OFDM symbols X(k) (also represented as Xi(k)) shown in FIG. 3. The OFDM symbols X(k) comprise a plurality of data symbols 401 and 402, a plurality of first training symbols 421 and 422, and a plurality of second training symbols 441 and 442.

In Step S62, the OFDM symbols X(k) are transformed into a plurality of time domain signals x(k) by the IFFT unit 14. The IFFT unit 14 transforms the OFDM symbols X(k) into a plurality of time domain signals x(k) in an IFFT manner. The plurality of time domain signals x(k) are orthogonal with respect to each other.

Then, in Step S64, the time domain signals x(k) are serialized into a transmitted signal 20 for being transmitted. Step S64 is performed by the P/S converting unit 16 and the transmitting filter 17.

Before Step S64, Step S63 is further performed, in which a guard interval is added to each of the time domain signals x(k). Step S63 is performed by the guard interval adding unit 15. A guard interval is added before each symbol, so as to overcome the influences caused by the multi-path phenomenon.

Figure 4:
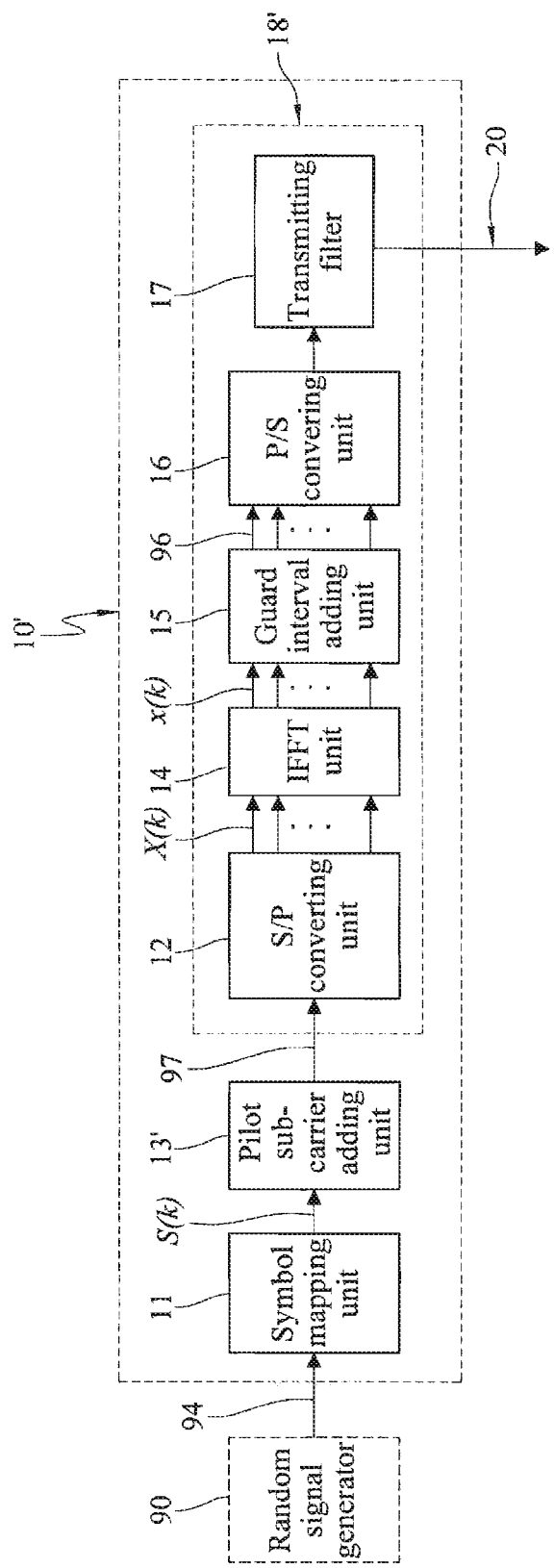
FIG. 4 is a schematic view of an OFDM transmitter according to another embodiment.

FIG. 4 shows a transmitter 10 according to another embodiment of the present invention. An embodiment of the signal transmitting method is accomplished by a transmitter 10' shown in FIG. 4.

As seen from FIG. 4, the transmitter 10' comprises a symbol mapping unit 11, a pilot sub-carrier insertion unit 13', and an OFDM modulator 18'. A difference between the transmitter 10' and the transmitter 10 in FIG. 1 is that, the pilot sub-carrier insertion unit 13' is moved from a position within the OFDM modulator 18 to a position behind the symbol mapping unit 11.

The pilot sub-carrier insertion unit 13' receives serial data sub-carriers S(k) and properly configures pilot sub-carriers 42a, 42b, 44a, and 44b between the serial data sub-carriers S(k) 40a, 40b, 40c, 40d, and 40e. The configuration manner is similar to that in FIG. 3, and the difference there-between is that the pilot sub-carriers 42a, 42b, 44a, and 44b are directly inserted in the serial data sub-carriers S(k) in this embodiment, whereas the above pilot sub-carrier insertion unit 13 inserts 42a, 42b, 44a, and 44b in the parallel data sub-carriers S(k).

In both FIGS. 4 and 1, the transmitters 10, 10' are used to implement the embodiment of the signal transmitting method, but the present invention is not limited here.

As discussed above, after being transmitted, the transmitted signal 20 reaches the receiver 30 through a plurality of paths. At this time, the transmitted signal 20 received by the receiver 30 comprises a channel impulse response h(k) and a noise w(k) in time domain, which is referred to as a receiving signal 26 with a channel response hereinafter. The noise w(k) comprises a thermal noise, a circuit noise, and the like. Therefore, a time-domain receiving signal 26 with a channel response received by the receiver 30 may be represented as $x(k) \otimes h(k) + w(k)$, where $\otimes$ means convolution operations, and a frequency-domain receiving signal 26 may be represented as $X(k) \times H(k) + W(k)$, in which the X(k), H(k), and W(k) correspond to frequency domain signals obtained after performing the fast Fourier transform (FFT) on the time domain signals x(k), h(k), and w(k) respectively.

Referring to FIG. 1 again, an embodiment of a signal receiving device in an OFDM system is further described. As seen from FIG. 1, the receiving signal 26 with a channel response is received by the receiver 30. The receiver 30 comprises an OFDM demodulator 38, an inter-subcarrier interference cancellation unit 39, and a symbol inverse mapping unit 92.

Figure 5:
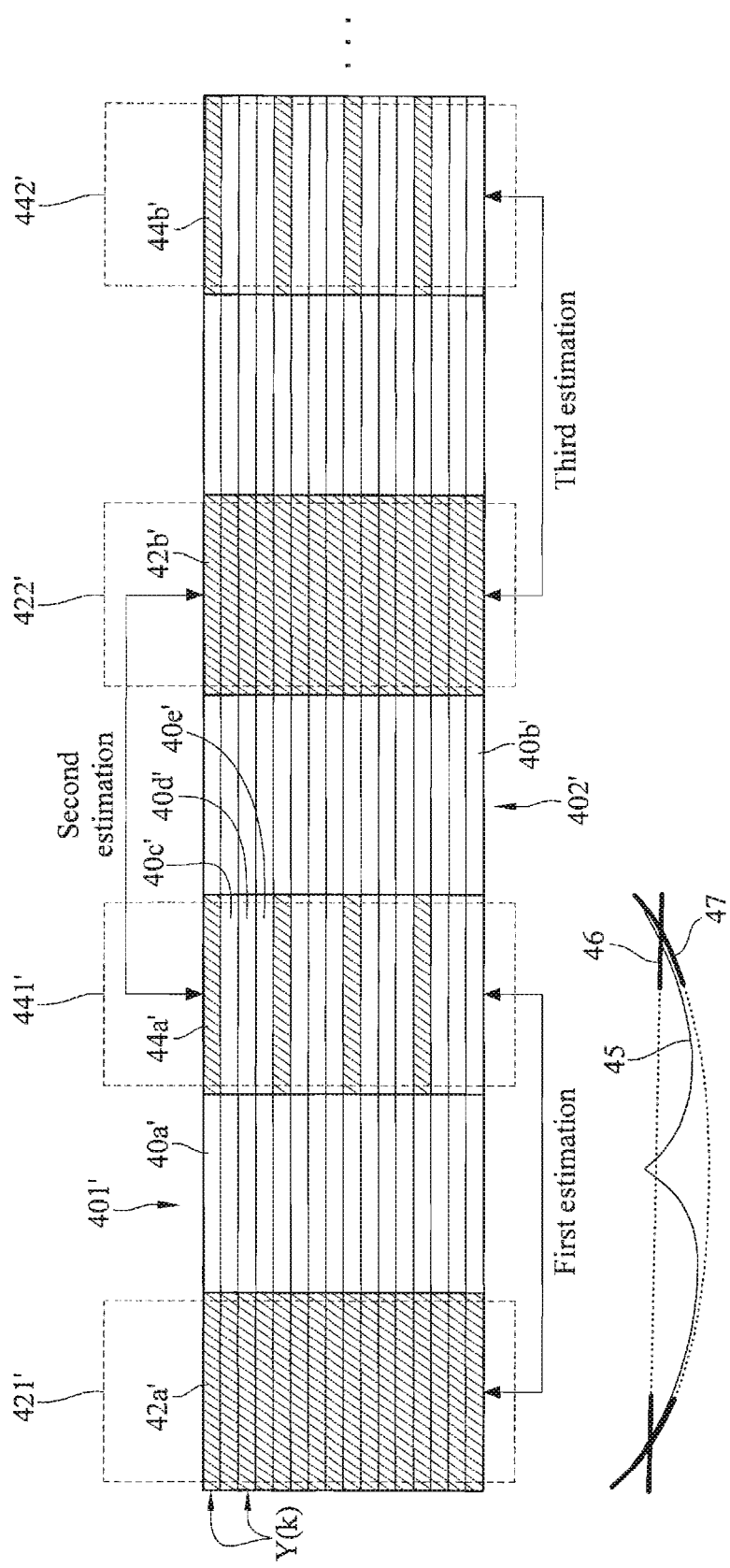
FIG. 5 is a schematic view of a plurality of frequency-domain receiving signals Y(k) received through a signal receiving method according to an embodiment.

The OFDM demodulator 38 demodulates the receiving signal 26 with a channel response to obtain a frequency-domain serial signal 98. Referring to FIG. 5, the frequency-domain serial signal comprises a plurality of data receiving signals 40a', 40b', 40c', 40d', and 40e', a plurality of first pilot receiving signals 42a' and 42b', and a plurality of second pilot receiving signals 44a' and 44b'. A difference between the frequency-domain serial signal 98 of the receiver 30 and the sub-carrier serial signal 94 of the transmitter 10 is that, the frequency-domain serial signal 98 is obtained through the receiving and demodulating processes after being transferred via a multi-path channel. Therefore, the frequency-domain serial signal 98 has a channel impulse response and a noise. In contrast with the frequency-domain serial signal 98, the sub-carrier serial signal 94 does not have a channel impulse response and a noise. The data receiving signals 40a', 40b', 40c', 40d', and 40e', the first pilot receiving signals 42a' and 42b', and the second pilot receiving signals 44a' and 44b' respectively correspond to the data sub-carriers 40a, 40b, 40c, 40d, and 40e, the pilot sub-carriers 42a and 42b in the first training symbols, and the pilot sub-carriers 44a and 44b in the second training symbols, and the arrangement manner thereof is the same as that of the transmitting end shown in FIG. 3.

The inter-subcarrier interference cancellation unit 39 is used for estimating a plurality of channel responses (details of the estimation method are illustrated below in detail) by using adjacent first training receiving symbols and second training receiving symbols, and restoring the data receiving signals 40a', 40b', 40c', 40d', and 40e' into the data sub-carriers 40a, 40b, 40c, 40d, and 40e by using the channel responses. The restored data sub-carriers R(k) are serial data, and are the same as the serial digital signals S(k).

The symbol inverse mapping unit 92 maps the restored data sub-carriers R(k) back to the serial receiving data. The mapping rule of the symbol inverse mapping unit 92 is an inverse function of the mapping rule of the symbol mapping unit 90.

The OFDM demodulator 38 comprises a receiving filter 31, an S/P converting unit 32, a guard interval removing unit 33, a fast Fourier transforming (FFT) unit 34, and a P/S converting unit 35.

The receiving filter 31 receives and filters the receiving signal 26 with a channel response, so as to form a filtered receiving signal 99a. The S/P converting unit 32 parallelizes the filtered receiving signal 99a to obtain a plurality of parallel first time-domain receiving signals 99b. The guard interval removing unit 33 removes guard intervals of the first time-domain receiving signals 99b to obtain a plurality of second time-domain receiving signals y(k). If the manner of removing the guard intervals by the guard interval removing unit 33 follows the above example of removing the cyclic prefix, each symbol originally has 128 dots, and a length of the guard interval is 40 dots, the guard interval removing unit 33 removes the guard interval occupying 40 dots from each first time-domain receiving signal transferred from the S/P converting unit 32.

The FFT unit 34 transforms the second time-domain receiving signals y(k) into a plurality of frequency-domain receiving signals Y(k) in an FFT manner. The P/S converting unit 35 serializes the frequency-domain receiving signals Y(k) into the frequency-domain serial signal 98.

The configuration manner of the frequency-domain receiving signals Y(k) is the same as the configuration manner of the sub-carriers in the OFDM symbols X(k) sent from the transmitter 10. FIG. 5 is a schematic view of a plurality of frequency-domain receiving signals Y(k) received through a signal receiving method according to an embodiment of the present invention. In the figure, the frequency-domain receiving signals Y(k) comprise the data receiving signals 40a', 40b', 40c', 40d', and 40e', the first pilot receiving signals 42a' and 42b', and the second pilot receiving signals 44a' and 44b'. As for the respective symbols, the frequency-domain receiving signals Y(k) comprise a plurality of first training receiving symbols 421' and 422', a plurality of second training receiving symbols 441' and 442', and a plurality of data receiving symbols 401' and 402'.

The adjacent first and second training receiving symbols 421', 422', 441', and 442' refer to 421' and 441', or 441' and 422', and the like.

As seen from FIG. 5, in the frequency-domain receiving signals Y(k), one data receiving symbol 401' exists between the adjacent first and second training receiving symbols 421' and 441'. The second training receiving symbol 441' further comprises the data receiving signals 40c', 40d', and 40e'. The data receiving signals located within the adjacent first and second training receiving symbols 421' and 441' comprise the data receiving signal 40a' between the first and second training receiving symbols 421' and 441', and the data receiving signals 40c', 40d', and 40e' within the second training receiving symbol 441'.

During implementation, the frequency-domain receiving signals Y(k) may correspond to the OFDM symbols X(k). That is to say, the OFDM symbols X(k) in FIG. 5 may be consistent with the frequency-domain receiving signals Y(k) in FIG. 3, but the present invention is not limited here. That is to say, besides only one data receiving symbol 401' as shown in FIG. 3 or FIG. 5, a plurality of data receiving symbols may also exist between the adjacent first and second training receiving symbols 421' and 441'.

The inter-subcarrier interference cancellation unit 39 estimates a channel response corresponding to each parallel frequency-domain receiving signal Y(k) by using the known adjacent first pilot receiving signal 42a' and second pilot receiving signal 44a', and then restores the data receiving signal 40a' between the adjacent first training receiving symbol 421' and second training receiving symbol 441', and the data receiving signals 40c', 40d', and 40e' within the second training receiving symbol 441' by using the channel responses.

As seen from the figure, the inter-subcarrier interference cancellation unit 39 firstly performs a first estimation on the adjacent first pilot receiving signal 42a' of the first training receiving symbol 421' and second pilot receiving signal 44a' of the second training receiving symbol 441' on the left side of the figure (the first two), and restores the data receiving signal 40a' in the data receiving symbol 401' and the data receiving signals 40c', 40d', and 40e' in the second training receiving symbol 441'. Next, the inter-subcarrier interference cancellation unit 39 performs a second estimation by using the adjacent second pilot receiving signal 44a' of the second training receiving symbol 441' and first pilot receiving signal 42b' of the first training receiving symbol 422', and then restores the data receiving signal 40b' in the data receiving symbol 402'. Similar operations are performed subsequently.

Figure 6:
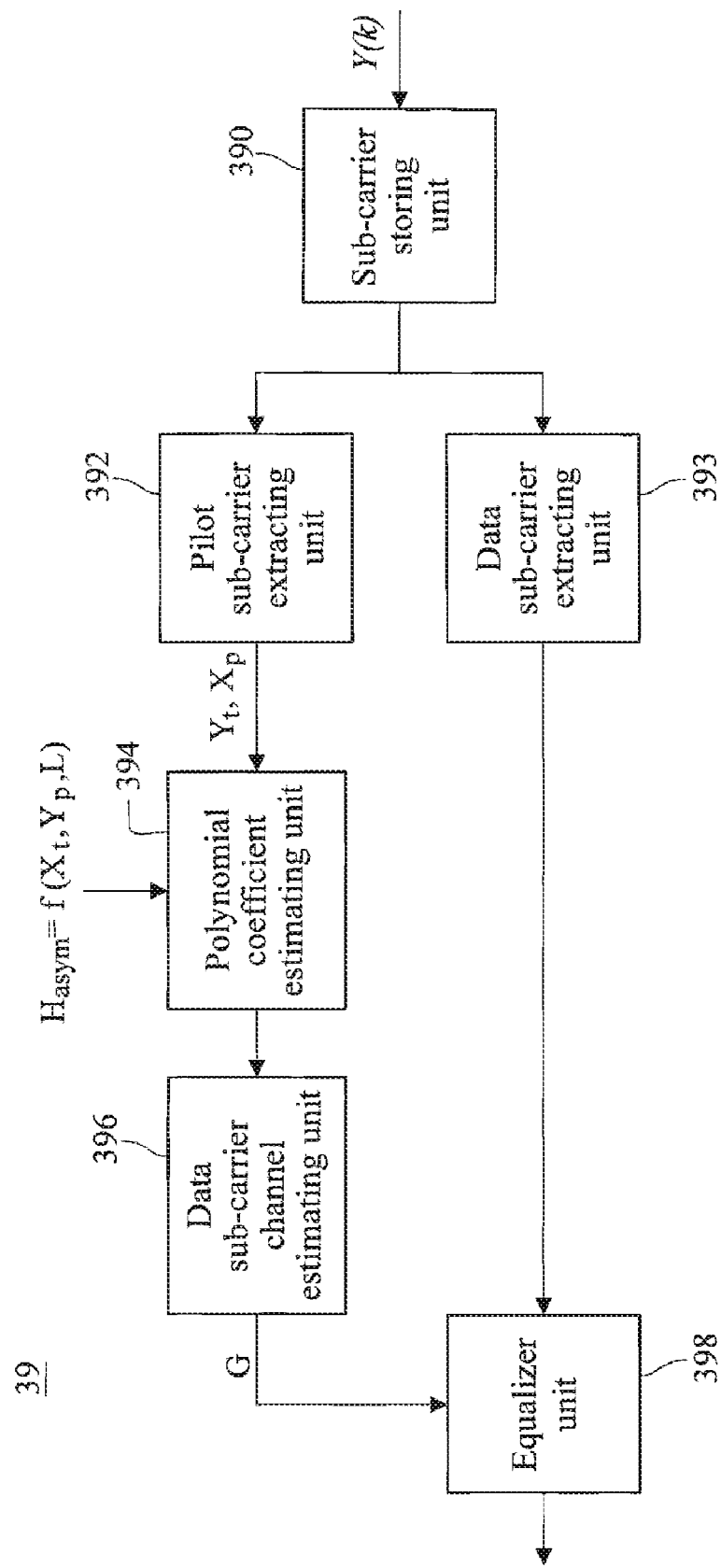
FIG. 6 is a schematic circuit block diagram of an inter-subcarrier interference cancellation unit of a receiver in an OFDM system according to an embodiment.

Next, FIG. 6 is a schematic circuit block diagram of an inter-subcarrier interference cancellation unit 39 of a receiver in an OFDM system according to an embodiment.

The inter-subcarrier interference cancellation unit 39 comprises a sub-carrier storing unit 390, a pilot sub-carrier extracting unit 392, a data sub-carrier extracting unit 393, a polynomial coefficient estimating unit 394, a data sub-carrier channel estimating unit 396, and an equalizer unit 398.

The sub-carrier storing unit 390 stores all the symbols to be estimated and restored in the frequency-domain serial signal 98, that is, all the symbols between the first training receiving symbol 421' and the second training receiving symbol 441' (including the training receiving symbols 421', 441' and the data receiving symbol 401'). For example, during the first estimation and restoration, the sub-carrier storing unit 390 stores (or extracts) the first training receiving symbol 421', the data receiving symbol 401', and the second training receiving symbol 441'. During the second estimation and restoration, the sub-carrier storing unit 390 stores the second training receiving symbol 441', the data receiving symbol 402', and the first training receiving symbol 422'. Similar operations are performed subsequently.

The pilot sub-carrier extracting unit 392 extracts the pilot receiving signals 42a' and 44a', that is, the first pilot receiving signal 42a' in the first training receiving symbol 421' and the second pilot receiving signal 44a' in the second training receiving symbol 441' from the sub-carrier storing unit 390. For example, during the first estimation and restoration, the pilot sub-carrier extracting unit 392 extracts the first pilot receiving signal 42a' of the first training receiving symbol 421' and the second pilot receiving signal 44a' of the second training receiving symbol 441'. During the second estimation and restoration, the pilot sub-carrier extracting unit 392 extracts the second pilot receiving signal 44a' of the second training receiving symbol 441', and the first pilot receiving signal 42b' of the first training receiving symbol 422'. Similar operations are performed subsequently.

During the first estimation and restoration, the data sub-carrier extracting unit 393 extracts the data receiving signal 40a' in the data receiving symbol 401' and the data receiving signals 40c', 40d', and 40e' in the second training receiving symbol 441' from the sub-carrier storing unit 390.

The polynomial coefficient estimating unit 394 estimates a plurality of polynomial coefficients by using the adjacent first pilot receiving signal 42a' and second pilot receiving signal 44a', the pilot sub-carriers 42a and 42b in the first training symbol, and the pilot sub-carriers 44a and 44b in the second training symbol. Subsequently, the data sub-carrier channel estimating unit 396 estimates the channel responses corresponding to the extracted data receiving signals 40a', 40c', 40d', and 40e' by using the polynomial coefficients. The equalizer unit 398 restores the extracted data receiving signals 40a', 40c', 40d', and 40e' into the data sub-carriers 40a, 40c, 40d, and 40e by using the channel responses.

The estimation manners of the polynomial coefficient estimating unit 394 and the data sub-carrier channel estimating unit 396 are illustrated as follows.

First, the first pilot sub-carriers 42a and 42b of the first training symbols 421 and the second pilot sub-carriers 44a and 44b of the second training symbols 441 transferred from the transmitter 10 are represented by $X_t$, $X_p$ respectively. The first pilot receiving signal 42a' of the first training receiving symbol 421' and the second pilot receiving signal 44a' of the second training receiving symbol 441 after being received and demodulated by the receiver 30 are represented by variables $Y_t$, $Y_p$ respectively.

Figure 7:
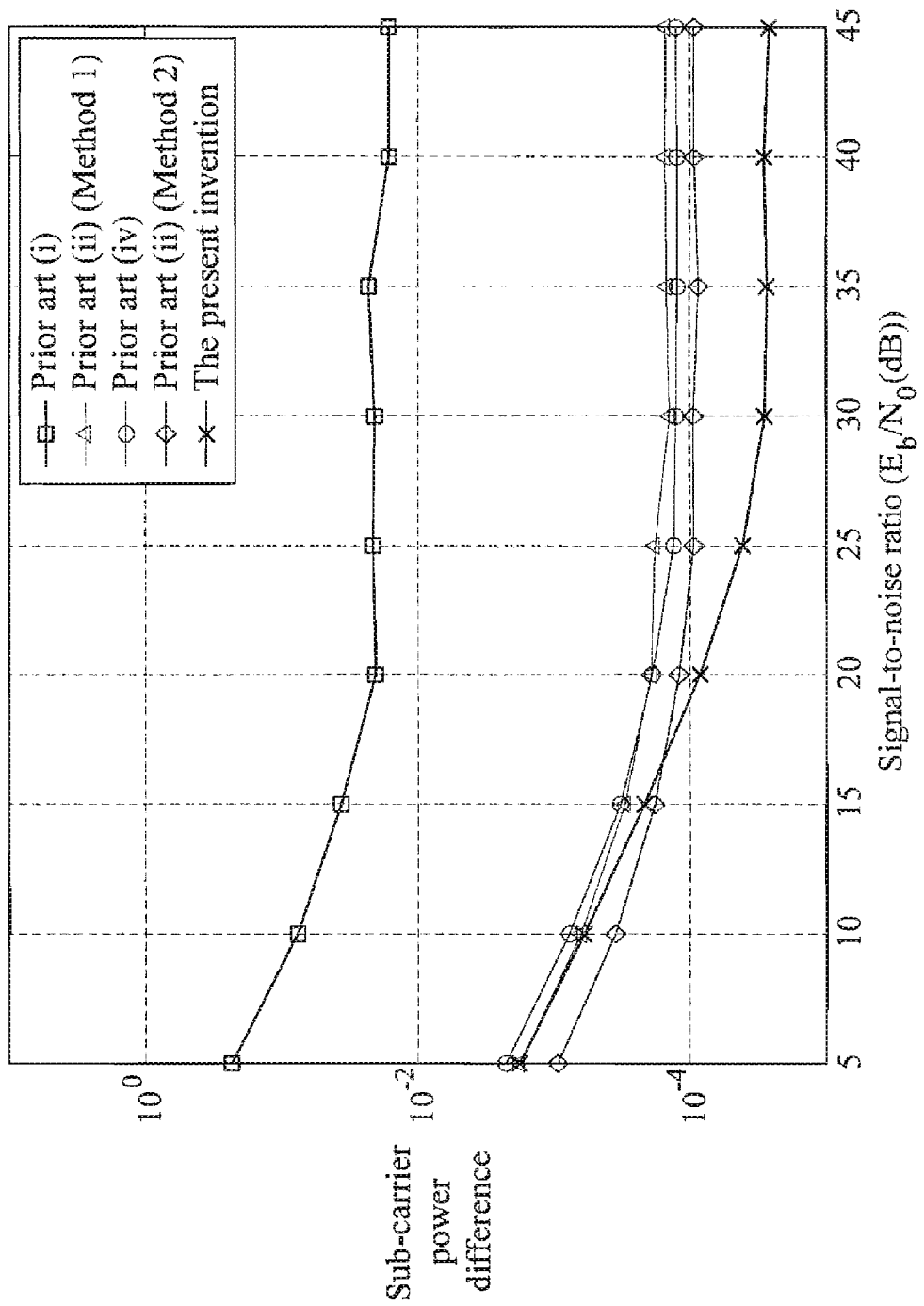
FIG. 7 is a schematic view of a multi-path channel time-varying curve.

An OFDM system with N active (parallel) sub-carriers is taken as an example (for example, as shown in FIG. 3, N is 16, and N is the number of the active sub-carriers, which corresponds to the dot number of the IFFT (IFFT size)). The first pilot receiving signal 42a' and the second pilot receiving signal 44a' of each of the N active sub-carriers are estimated by using a Qth-order polynomial coefficient estimator 394. That is to say, the channel responses of a plurality of paths are firstly simulated with a plurality of (in the example, l) Qth-order polynomials with a plurality of coefficients (that is, Step S820 below, which is illustrated in detail below). Each polynomial describes a channel response of one path. FIG. 7 is a schematic view of a multi-path channel time-varying curve. k represents a sampling point on the time axis. One symbol interval comprises a plurality of sampling points. l represents a number of paths (i.e., path number). $g_i(k, l)$ represents a channel change of an $l^{th}$ path at the $k^{th}$ sampling point in the $i^{th}$ pilot sub-carrier, that is, a gain of an $l^{th}$ path of a channel response at the $k^{th}$ sampling time.

$$g_i(k,l) = a_{0,i} + a_{1,i}k + a_{2,i}k^2 + \ldots, k=0,1,2,\ldots,N-1$$

The channel response matrix G is as follows.

$$G = \begin{bmatrix} g(0,0) & 0 & \cdots & 0 & g(0,L-1) & g(0,L-2) & \cdots & g(0,1) \\ g(1,1) & g(1,0) & 0 & \cdots & 0 & g(1,L-1) & \cdots & g(1,2) \\ \vdots & \ddots & & \ddots & & \ddots & & \vdots \\ 0 & \cdots & 0 & g(N-1,L-1) & g(N-1,L-2) & \cdots & \cdots & g(N-1,0) \end{bmatrix}$$

$$G = \begin{bmatrix} a_0 + b_0 \cdot 0 & 0 & \cdots & 0 & a_{L-1} + b_{L-1} \cdot 0 & a_{L-2} + b_{L-2} \cdot 0 & \cdots & a_1 + b_1 \cdot 0 \\ a_1 + b_1 \cdot 1 & a_0 + b_0 \cdot 1 & 0 & \cdots & 0 & a_{L-1} + b_{L-1} \cdot 1 & \cdots & a_2 + b_2 \cdot 1 \\ \vdots & \ddots & & & & \ddots & & \vdots \\ 0 & \cdots & 0 & a_{L-1} + b_{L-1}(N-1) & a_{L-2} + b_{L-2}(N-1) & \cdots & \cdots & a_0 + b_0 \cdot (N-1) \end{bmatrix}$$

The frequency-domain and time-domain transmitted signals at the $i^{th}$ symbol are represent by $X_i(p)$ and $x_i(k)$. The time-domain receiving signal obtained after a guard interval is removed is $y_i(k)$. Next, the demodulation is performed in an FFT manner. After the demodulation process, $Y_i(p)$ represents the changes from the $l^{th}$ path of the $p^{th}$ active sub-carrier in the signal received by the $i^{th}$ training symbol, and through analysis, the influence of the $m^{th}$ active sub-carrier may be represented as the following Equation (1):

$$Y_i(p) = X_i(p) \cdot \sum_{l=0}^{L-1} a_{0,l} \exp\left(-j2\pi \frac{pl}{N}\right) + \quad (1)$$

$$\sum_{q=1}^{Q} \sum_{l=0}^{L-1} a_{q,l} \cdot \sum_{m=0}^{N-1} X_i(m) SCC_i^q(p-m) \exp\left(-j2\pi \frac{ml}{N}\right) +$$

$$W_i(p), \ i = 1, 2$$

In the above equation, $W_i(p)$ represents noise component of the $p^{th}$ active sub-carrier in the $i^{th}$ training symbol.

A sub-carrier correlation (SCC) vector is defined as follows. D is a number of data symbols between adjacent training symbols (that is, the number of symbols occupied by the data sub-carrier 401 between the adjacent training symbols 421 and 441). Accordingly, the active sub-carriers of the $i^{th}$ training symbol $X_i$ (that is, the pilot sub-carriers 421, 441) from $(i-1)(D+1)(N+L)$ to $(i-1)(D+1)(N+L)+(N-1)$ are represented as follows.

$$SCC_i^q(p) = \frac{1}{N} \sum_{k=0}^{N-1} (k + (i-1)(D+1)(N+L))^q \exp\left(-j2\pi \frac{pk}{N}\right), \quad (2)$$

-continued $k = 0, 1, \ldots, N-1,$ $q = 1, 2, \ldots, Q,$ $i = 1, 2$

The frequency-domain receiving signals $Y_t(p) = Y_1(p)$, $Y_p(p(v)) = Y_2(p)$, $p = 0, 1, \ldots, N-1$, $v = 0, 1, \ldots, N_p - 1$ in Equation (1) are represent as follows in a matrix form.

$$\begin{bmatrix} Y_t \\ Y_p \end{bmatrix} = \begin{bmatrix} A_t & B_t^1 & B_t^2 & \cdots & B_t^Q \\ A_p & B_p^1 & B_p^2 & \cdots & B_p^Q \end{bmatrix} \begin{bmatrix} a_{0,0} \\ a_{0,1} \\ \vdots \\ a_{0,L-1} \\ a_{1,0} \\ a_{1,1} \\ \vdots \\ a_{1,L-1} \\ \vdots \\ a_{Q,L-1} \end{bmatrix} + \begin{bmatrix} W_t \\ W_p \end{bmatrix} \quad (3)$$

$H_{asy}$ dimension is defined as $(N+N_p) \times (Q+1)L$, which is represented as follows in a matrix form.

$$H_{asy} = \begin{bmatrix} A_t & B_t^1 & B_t^2 & \cdots & B_t^Q \\ A_p & B_p^1 & B_p^2 & \cdots & B_p^Q \end{bmatrix}_{(N+N_p) \times (Q+1)L} \quad (4)$$

The parameters $A_t$, $A_p$, $B_t^q$, and $B_p^q$ of known asymmetric training symbols $(X_t, X_p)$ are listed in the following Table 2.

TABLE 2

Parameter Settings for Estimator $H_{asy}$

Variable Definition

| | |
|---|---|
| $A_t$ | $\begin{bmatrix} X_1(0)e^{(-j2\pi \frac{0 \cdot 0}{N})} & X_1(0)e^{(-j2\pi \frac{0 \cdot 1}{N})} & \cdots & X_1(0)e^{(-j2\pi \frac{0 \cdot (L-1)}{N})} \\ X_1(1)e^{(-j2\pi \frac{1 \cdot 0}{N})} & X_1(0)e^{(-j2\pi \frac{1 \cdot 1}{N})} & \cdots & X_1(1)e^{(-j2\pi \frac{1 \cdot (L-1)}{N})} \\ \vdots & \vdots & \ddots & \vdots \\ X_1(N-1)e^{(-j2\pi \frac{(N-1) \cdot 0}{N})} & X_1(N-1)e^{(-j2\pi \frac{(N-1) \cdot 1}{N})} & \cdots & X_1(N-1)e^{(-j2\pi \frac{(N-1)(L-1)}{N})} \end{bmatrix}$ |

TABLE 2-continued

Parameter Settings for Estimator $H_{asy}$

| Variable | Definition |
|---|---|
| $A_p$ | $\begin{bmatrix} X_2(p(0))e^{\left(-j2\pi\frac{p(0)\cdot 0}{N}\right)} & X_2(p(0))e^{\left(-j2\pi\frac{p(0)\cdot 1}{N}\right)} & \cdots & X_2(p(0))e^{\left(-j2\pi\frac{p(0)\cdot(L-1)}{N}\right)} \\ X_2(p(1))e^{\left(-j2\pi\frac{p(1)\cdot 0}{N}\right)} & X_2(p(1))e^{\left(-j2\pi\frac{p(1)\cdot 1}{N}\right)} & \cdots & X_2(p(1))e^{\left(-j2\pi\frac{p(1)\cdot(L-1)}{N}\right)} \\ \vdots & \vdots & \ddots & \vdots \\ X_2(p(N_p-1))e^{\left(-j2\pi\frac{(N_p-1)\cdot 0}{N}\right)} & X_2(p(N_p-1))e^{\left(-j2\pi\frac{p(N_p-1)\cdot 1}{N}\right)} & \cdots & X_2(p(N_p))e^{\left(-j2\pi\frac{p(N_p-1)\cdot(L-1)}{N}\right)} \end{bmatrix}$ |
| $B_t^q$ | $\begin{bmatrix} \sum_{m=1}^{N-1} X_1(m)e^{-j2\pi\frac{m\cdot 0}{N}} SCC_i^q(0-m) & \sum_{m=1}^{N-1} X_1(m)e^{-j2\pi\frac{m\cdot 1}{N}} SCC_i^q(0-m) & \cdots & \sum_{m=1}^{N-1} X_1(m)e^{-j2\pi\frac{m\cdot(L-1)}{N}} SCC_i^q(0-m) \\ \sum_{\substack{m\neq 1 \\ m=0}}^{N-1} X_1(m)e^{-j2\pi\frac{m\cdot 0}{N}} SCC_i^q(1-m) & \sum_{\substack{m\neq 1 \\ m=0}}^{N-1} X_1(m)e^{-j2\pi\frac{m\cdot 1}{N}} SCC_i^q(1-m) & \cdots & \sum_{\substack{m\neq 1 \\ m=0}}^{N-1} X_1(m)e^{-j2\pi\frac{m\cdot(L-1)}{N}} SCC_i^q(1-m) \\ \vdots & \vdots & \ddots & \vdots \\ \sum_{m=0}^{N-2} X_1(m)e^{-j2\pi\frac{m\cdot 0}{N}} SCC_i^q(N-1-m) & \sum_{m=0}^{N-2} X_1(m)e^{-j2\pi\frac{m\cdot 1}{N}} SCC_i^q(N-1-m) & \cdots & \sum_{m=0}^{N-2} X_1(m)e^{-j2\pi\frac{m\cdot(L-1)}{N}} SCC_i^q(N-1-m) \end{bmatrix}$ |
| $B_p^q$ | $\begin{bmatrix} \sum_{\substack{m\neq p(0) \\ m\in\mathcal{P}}} X_2(m)e^{-j2\pi\frac{m\cdot 0}{N}} SCC_i^q(p(0)-m) & \sum_{\substack{m\neq p(0) \\ m\in\mathcal{P}}} X_2(m)e^{-j2\pi\frac{m\cdot 1}{N}} SCC_i^q(p(0)-m) & \cdots & \sum_{\substack{m\neq p(0) \\ m\in\mathcal{P}}} X_2(m)e^{-j2\pi\frac{m\cdot(L-1)}{N}} SCC_i^q(p(0)-m) \\ \sum_{\substack{m\neq p(1) \\ m\in\mathcal{P}}} X_2(m)e^{-j2\pi\frac{m\cdot 0}{N}} SCC_i^q(p(1)-m) & \sum_{\substack{m\neq p(1) \\ m\in\mathcal{P}}} X_2(m)e^{-j2\pi\frac{m\cdot 1}{N}} SCC_i^q(p(1)-m) & \cdots & \sum_{\substack{m\neq p(1) \\ m\in\mathcal{P}}} X_2(m)e^{-j2\pi\frac{m\cdot(L-1)}{N}} SCC_i^q(p(1)-m) \\ \vdots & \vdots & \ddots & \vdots \\ \sum_{\substack{m\neq p(N_p-1) \\ m\in\mathcal{P}}} X_2(m)e^{-j2\pi\frac{m\cdot 0}{N}} SCC_i^q(p(N_p-1)-m) & \sum_{\substack{m\neq p(N_p-1) \\ m\in\mathcal{P}}} X_2(m)e^{-j2\pi\frac{m\cdot 1}{N}} SCC_i^q(p(N_p-1)-m) & \cdots & \sum_{\substack{m\neq p(N_p-1) \\ m\in\mathcal{P}}} X_2(m)e^{-j2\pi\frac{m\cdot(L-1)}{N}} SCC_i^q(p(N_p-1)-m) \end{bmatrix}$ | q is the order number of the Qth-order polynomial. Equation (3) is then solved through a least-square method to obtain the coefficients in the time-varying channel curve estimation.

$$[\hat{a}_{0,0} \ldots \hat{a}_{0,L-1}\ \hat{a}_{1,0} \ldots \hat{a}_{1,L-1} \ldots \hat{a}_{Q,0} \ldots \hat{a}_{Q,L-1}]^T = \quad (5)$$

$$(H_{asy}^H H_{asy})^{-1} H_{asy}^H \begin{bmatrix} Y_t \\ Y_p \end{bmatrix}$$

The data sub-carrier channel estimating unit 396 utilizes the Qth-order polynomial and the polynomial coefficients (or referred to as channel time-varying characteristic coefficients), $a_{q,\ l}$, q=0, 1, 2, . . . , estimated by the polynomial coefficient estimating unit 394 to calculate channel changes of the $l^{th}$ path at the $k^{th}$ sampling point in the $i^{th}$ training symbol.

$$g_i(k,l) = \sum_{q=0}^{Q} a_{q,l} \cdot (k+(i-1)(D+1)(N+L))^q, \quad (6)$$

$$k = 0, 1, 2, \ldots N-1,$$

$$l = 0, 1, \ldots, L-1$$

$$i = 1, 2$$

With reference to the above estimation method, FIG. 5 is a schematic view of a plurality of frequency-domain receiving signals Y(k) received through the signal receiving method. As seen from the figure, a plurality of data receiving symbols 401' exists between the adjacent first training receiving symbol 421' and second training receiving symbol 441' on the time axis (the transverse axis in the figure). Consecutive data receiving symbols 401' at each parallel frequency-domain receiving signal Y(k) occupy a plurality of symbol intervals. That is to say, the transmitter 10 configures a plurality of data symbols 401 between the first training symbol 421 and the second training symbol 441, so as to obtain higher bandwidth for transferring data.

As the first pilot receiving signal 42a' and the second pilot receiving signal 44a' are known data contents, as for each parallel frequency-domain receiving signal Y(k), four parameters ($A_t$, $A_p$, $B_t^q$, $B_p^q$) corresponding to the frequency-domain receiving signal Y(k) may be calculated through two known asymmetric pilot sub-carriers ($X_t$, $X_p$). $X_t$ is the transferred first pilot sub-carrier 42a. $X_p$ is the transferred second pilot sub-carrier 44a. Next, the channel time-varying characteristic coefficient $a_{q,\ l}$ is calculated by using Equation (5) with the received two known asymmetric training receiving symbols ($Y_t$, $Y_p$). $Y_t$ is the received first pilot receiving signal 42a'. $Y_p$ is the received second pilot receiving signal 44a'. In the end, a channel response of the data sub-carrier is interpolated through interpolation, so as to accomplish the channel estimation.

Referring to the curve below FIG. 5, the curve marked as 45 is a schematic curve of a real channel response corresponding to one frequency-domain receiving signal Y(k). The curve marked as 46 is a schematic curve of an estimated channel response obtained through a first-order polynomial estimation manner (Q=1). The curve marked as 47 is a schematic curve of an estimated channel response obtained through a second-order polynomial estimation manner (Q=2). The real-line parts at two ends of the schematic curves 46, 47 of the estimated channel response represent estimation values practically estimated by using the first and second pilot receiving signals 42a' and 44a'. The dotted-line parts in the middle of the schematic curves 46, 47 of the estimated channel response represent values calculated through interpolation based on the estimated coefficients. In such a manner, the data receiving signals 40a', 40c', 40d', and 40e' corresponding to the frequency-domain receiving signal Y(k) are restored into the transferred data sub-carriers 40a, 40c, 40d, and 40e by using the estimated channel response H(k).

Comparing the schematic curves 46, 47 of the estimated channel response with the schematic curve 45 of the practical channel response, it may be seen that, the schematic curve 47 of the estimated channel response obtained through the second-order polynomial is much closer to the schematic curve 45 of the practical channel response. Although FIG. 5 shows that error values between the schematic curve 45 of the practical channel response and the schematic curve 47 of the estimated channel response obtained through the second-order polynomial in the middle section of the consecutive data receiving symbols 401' are relatively large, such a problem can be solved by decreasing the number of the data symbols 401 and 402 between the first training symbols 421 and 422 and the second training symbols 441 and 442. In addition, the larger the order number of the polynomial estimation is (that is, Q=3, 4 or even larger), the smaller the error from the schematic curve 45 of the practical channel response will be. This may be adjusted according to practical application situation.

Figure 8:
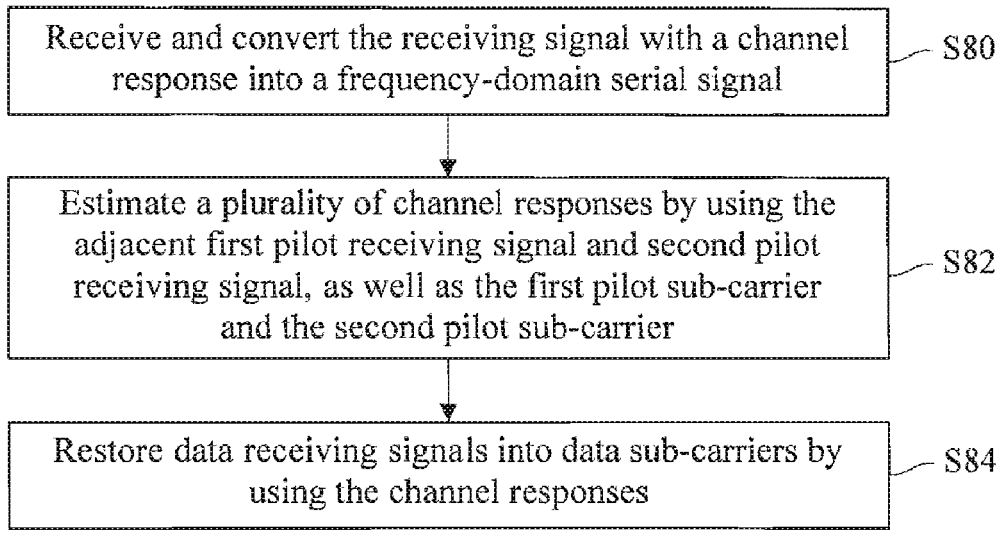
FIG. 8 is a schematic flow chart of a signal receiving method in an OFDM system according to an embodiment.

An embodiment of a signal receiving method in an OFDM system is further provided. The signal receiving method is suitable for receiving the transmitted signal 20 transmitted through the signal transmitting method. The OFDM system comprises a receiver 30 for performing the signal receiving method. The transmitted signal 20 is transferred to the receiver 30 through a plurality of paths to become a receiving signal with a channel response. Referring to FIG. 8, the signal receiving method comprises the following steps.

In Step S80, the receiving signal 26 with a channel response is received and converted into a frequency-domain serial signal 98. The frequency-domain serial signal 98 comprises a plurality of data receiving symbols 401' and 402', a plurality of first training receiving symbols 421' and 422', and a plurality of second training receiving symbols 441' and 442'. A plurality of data receiving signals 40a' and 40b' of the receiving symbols 401' and 402', a plurality of first pilot receiving signals 42a' and 42b', and a plurality of second pilot receiving signals 44a' and 44b' correspond to the data sub-carriers 40a and 40b, the first pilot sub-carriers 42a and 42b, and the second pilot sub-carriers 44a and 44b respectively.

In Step S82, a plurality of channel responses is estimated by using the adjacent first pilot receiving signal 42a' of the first training receiving symbol 421' and second pilot receiving signal 44a' of the second training receiving symbol 441', as well as the first pilot sub-carrier 42a in the first training symbol 421 and the second pilot sub-carrier 44a in the second training symbol 441.

In Step S84, the data receiving signals 40a', 40c', 40d', and 40e' in the adjacent first and second training symbols 421' and 441' are restored into the data sub-carriers 40a, 40c, 40d, and 40e by using the channel responses.

Figure 9:
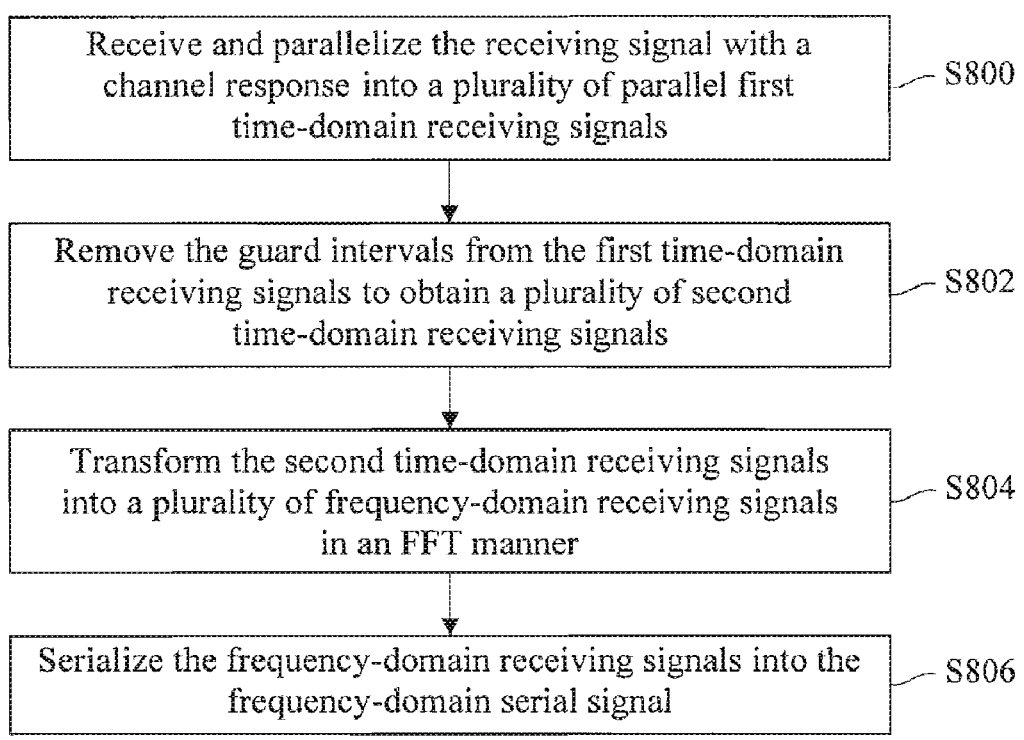
FIG. 9 is a schematic flow chart of Step S80 in the signal receiving method in an OFDM system according to an embodiment.

The process of receiving and converting the receiving signal 26 with a channel response into a frequency-domain serial signal 98 in Step S80 is accomplished by the OFDM demodulator 38. FIG. 9 is a schematic flow chart of Step S80. Step S80 may further comprise the following steps.

In Step S800, the receiving signal 26 with a channel response is received and parallelized into a plurality of parallel first time-domain receiving signals 99b.

In Step S802, the guard intervals are removed from the first time-domain receiving signals 99b to obtain a plurality of second time-domain receiving signals y(k).

In Step S804, the second time-domain receiving signals y(k) are transformed into a plurality of frequency-domain receiving signals Y(k) in an FFT manner.

In Step S806, the frequency-domain receiving signals Y(k) are serialized into the frequency-domain serial signal 98.

Step S800 is accomplished by the receiving filter 31 and the S/P converting unit 32. Steps S802, S804, and S806 are performed by the guard interval removing unit 33, the FFT unit 34, and the P/S converting unit 35 respectively.

The process of estimating a plurality of channel responses by using the adjacent first pilot receiving signal 42a' of the first training receiving symbol 421' and second pilot receiving signal 44a' of the second training receiving symbol 441', as well as the first pilot sub-carrier 42a in the first training symbol 421 and the second pilot sub-carrier 44a in the second training symbol 441 in Step S82 is performed by the polynomial coefficient estimating unit 394 and the data sub-carrier channel estimating unit 396. In Step S82, when a channel response of each of the paths is calculated, the channel response corresponding to each of the paths is approximated by using the same polynomial. The polynomial is a first-order polynomial, a second-order polynomial, or a high-order polynomial.

Figure 10:
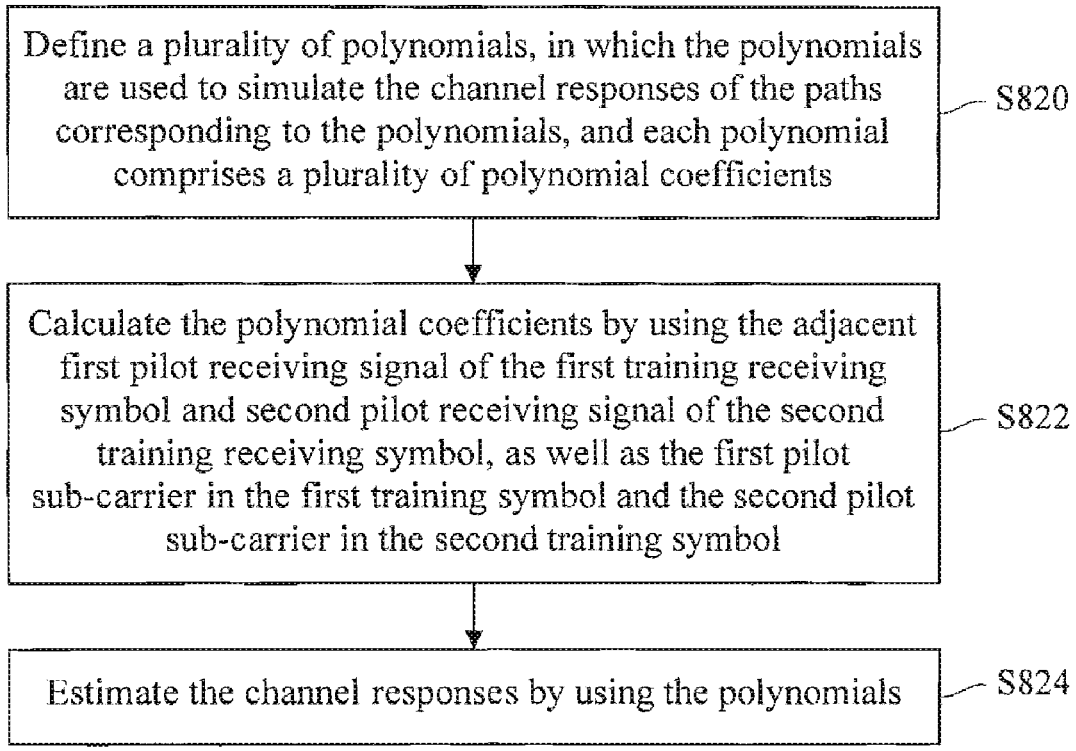
FIG. 10 is a schematic flow chart of Step S82 in the signal receiving method in an OFDM system according to an embodiment.

The example of Step S82 may be obtained with reference to FIG. 10. FIG. 10 is a schematic flow chart of Step S82 in the signal receiving method in an OFDM system according to an embodiment of the present invention. As seen from FIG. 10, Step S82 comprises the following steps.

In Step S820, a plurality of polynomials is defined. The polynomials are used to describes the channel responses of the paths corresponding to the polynomials. Each of the polynomials comprises a plurality of polynomial coefficients.

In Step S822, the polynomial coefficients are calculated by using the adjacent first pilot receiving signal 42a' of the first training receiving symbol 421' and second pilot receiving signal 44a' of the second training receiving symbol 441', as well as the first pilot sub-carrier 42a in the first training symbol 421 and the second pilot sub-carrier 44a in the second training symbol 441.

In Step S824, the channel responses are estimated by using the polynomials.

The polynomial coefficients (or referred to as channel time-varying characteristic coefficients) in Step S820 are $a_{q,l}$, q=0, 1, 2, ..., Q, l=0, 1, 2, ..., L−1. Each polynomial is used to simulate a channel response of each path. That is to say, the number of polynomials is equal to the number of the paths. That is, from the above example, totally L paths and L polynomials exist. If each polynomial is a Qth-order polynomial (a channel response of each path is simulated with a Qth-order polynomial), each Qth-order polynomial has (Q+1) coefficients. Therefore, the number of the polynomial coefficients in Step S820 is totally L*(Q+1).

The estimation manner in Step S822 is obtained based on Equations (1) to (4). That is, the calculation is performed by using the four parameters ($A_t$, $A_p$, $B^q_t$, $B^q_p$) of the frequency-domain receiving signals Y(k).

In Step S824, the channel responses (that is, channel changes) may be estimated according to Equation (6).

In Step S84, the process of restoring the data receiving signals 40a', 40c', 40d', and 40e' into the data sub-carriers 40a, 40c, 40d, and 40e by using the channel responses may be performed by the equalizer unit 398.

Figure 11:
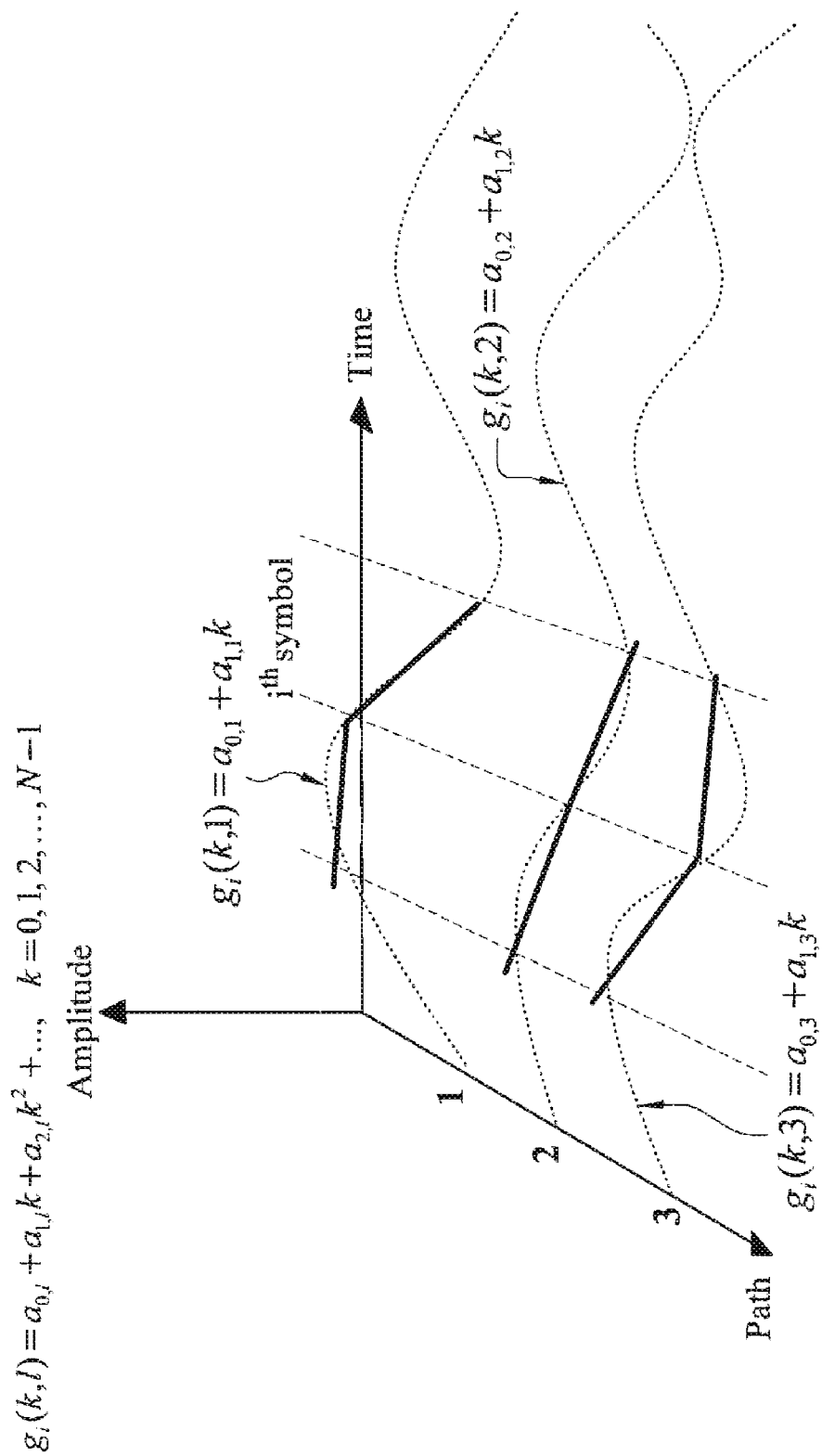
FIG. 11 is a schematic view of performance comparison between the signal transmitting method and the signal receiving method in an OFDM system according to an embodiment and that of the prior art.

FIG. 11 is a schematic view of performance comparison between the signal transmitting method and the signal receiving method in the OFDM system according to an embodiment of the present invention and that of the prior art. The estimation method (i), method 1 in the estimation method (ii), method 2 in the estimation method (ii), the estimation method (iv) in the prior art and the estimation method in the embodiment of the present invention are mainly compared. Environment parameters and settings in the comparison are listed in Table 3 below.

TABLE 3

| | |
|---|---|
| Carrier Frequency | 2G |
| Bandwidth (BW) | 5 MHz |
| Power delay profile (COST207 Tapped delay line model) | Bad urban (BU) |
| Max delay spread | 10 us |
| Path Number | 12 |
| Active sub-carriers (N) | 512 |
| Active sub-carrier spacing | 9.76 kHz |
| Guard interval overhead | 1/8 Symbol |
| OFDM symbol duration (Ts) | (w/o GI) 102.4 us |
| Normalized Doppler frequency (fdT) | 0.1 |
| Velocity | 400 km/h |
| Doppler spread (fd) | 1000 Hz |
| Environment | High speed rail |
| Channel Estimation Method | Second-order polynomial $2^{nd}$ order (Q = 2) |

In FIG. 11, the transverse axis is signal-to-noise ratio (SNR) per bit (the energy per bit to noise power spectral density ratio, $E_b/N_o$ (dB)), and the longitudinal axis is a normalized sub-carrier power (normalized mean square error, NMSE), that is, the difference between the estimated channel response and the practical channel response. A smaller value on the longitudinal axis represents a smaller estimation error, and the estimation accuracy is higher. As seen from the figure, the higher the SNR in an environment is, the smaller the error obtained through the method according to the embodiments will be. In the situation that the SNR per bit is about higher than 16 dB, the smallest error is generated through the method according to the embodiments.

The invention claimed is:

1. A signal transmitting method in an orthogonal frequency-division multiplexing (OFDM) system, wherein the OFDM system comprises a transmitter, the signal transmitting method at least comprising:
receiving and converting a serial digital signal into a plurality of OFDM symbols,
wherein the OFDM symbols comprise a plurality of data symbols, a plurality of first training symbols, and a plurality of second training symbols, and the OFDM symbols align along a time sequence of one first training symbol, a number of data symbols, one second training symbol and another number of data symbols repeatedly;
wherein each of the data symbols comprises a plurality of first data sub-carriers, each of the first training symbols comprises a plurality of first pilot sub-carriers, and each of the second training symbols comprise a plurality of second pilot sub-carriers and a plurality of second data sub-carriers; and
wherein a number of the second pilot sub-carriers is different from a number of the first pilot sub-carriers, and every part of the second data sub-carriers is placed between two of the second pilot sub-carriers in each of the second training symbols;
transforming the OFDM symbols into a plurality of time domain signals; and
serializing the time domain signals into a transmitted signal and transmitting the transmitted signal.

2. The signal transmitting method according to claim 1, wherein a number of the second pilot sub-carriers of the second training symbols is one third of a number of the second data sub-carriers of the second training symbols.

3. The signal transmitting method according to claim 1, wherein a frequency spacing between adjacent second pilot sub-carriers in the second training symbols is smaller than a coherent bandwidth.

4. The signal transmitting method according to claim 1, wherein before the step of serializing the time domain signals into a transmitted signal and transmitting the transmitted signal, the method further comprises:
adding a guard interval in each of the time domain signals.

5. The signal transmitting method according to claim 1, wherein the step of transforming the OFDM symbols into the plurality of time domain signals comprises transforming the sub-carriers of the OFDM symbols into the time domain signals in an inverse fast Fourier transform (IFFT) manner.

6. The signal transmitting method according to claim 5, wherein at least one data symbol exists between the first training symbol and the second training symbol.

7. A signal receiving method in an orthogonal frequency-division multiplexing (OFDM) system, suitable for receiving the transmitted signal transmitted through the signal transmitting method according to claim 1, wherein the OFDM system comprises a receiver, and the transmitted signal is transferred to the receiver through a plurality of paths to become a receiving signal with a channel response, the signal receiving method at least comprising:
receiving and converting the receiving signal with a channel response into a frequency-domain serial signal,
wherein the frequency-domain serial signal comprises a plurality of data receiving symbols, a plurality of first training receiving symbols, and a plurality of second training receiving symbols;
wherein each of the data receiving symbols comprises a plurality of first data receiving signals corresponding to the first data sub-carriers, each of the first training receiving symbols comprises a plurality of first pilot receiving signals corresponding to the first pilot sub-carriers, and each of the second training receiving symbols comprises a plurality of second pilot receiving signals and a plurality of second data receiving signals, the second pilot receiving signals corresponding to the second pilot sub-carriers, and the second data receiving signals corresponding to the second data sub-carriers; and
wherein a number of the second pilot receiving signals is different from a number of the first pilot receiving signals, and every part of the second data receiving signals is placed between two of the second pilot receiving signals in the second training receiving symbols;
estimating a plurality of channel responses of the first and second data receiving signals by using the adjacent first pilot receiving signals of the first training receiving symbols and second pilot receiving signals of the second training receiving symbols, as well as the first pilot sub-carriers in the first training symbols and the second pilot sub-carriers in the second training symbols; and restoring the first and second data receiving signals in the adjacent first and second training symbols into the first and second data sub-carriers by using the channel responses, respectively.

8. The signal receiving method according to claim 7, wherein the step of estimating the plurality of channel responses by using the adjacent first pilot receiving signals of the first training receiving symbols and second pilot receiving signals of the second training receiving symbols, as well as the first pilot sub-carriers in the first training symbols and the second pilot sub-carriers in the second training symbols further comprises:

defining a plurality of polynomials, wherein the polynomials describe the channel responses corresponding to the paths, and each of the polynomials comprises a plurality of polynomial coefficients;

calculating the polynomial coefficients by using the adjacent first pilot receiving signals of the first training receiving symbols and second pilot receiving signals of the second training receiving symbols, as well as the first pilot sub-carriers in the first training symbols and the second pilot sub-carriers in the second training symbols; and estimating the channel responses by using the polynomials.

9. The signal receiving method according to claim 8, wherein the step of estimating the channel responses by using the polynomials further comprises:

interpolating channel responses of the first and second data sub-carriers through interpolation.

10. The signal receiving method according to claim 8, wherein the polynomial is a first-order polynomial, a second-order polynomial, or a high-order polynomial.

11. The signal receiving method according to claim 7, wherein the step of receiving and converting the receiving signal into a frequency-domain serial signal comprises:

receiving and parallelizing the receiving signal with a channel response into a plurality of parallel first time-domain receiving signals;

removing guard intervals from the first time-domain receiving signals to obtain a plurality of second time-domain receiving signals;

transforming the second time-domain receiving signals into a plurality of frequency-domain receiving signals in a fast Fourier transform (FFT) manner; and serializing the frequency-domain receiving signals into the frequency-domain serial signal.

12. A receiver in an orthogonal frequency-division multiplexing (OFDM) system, suitable for receiving the transmitted signal transmitted through the signal transmitting method according to claim 1, wherein the transmitted signal is transferred to the receiver through a plurality of paths to become a receiving signal with a channel response, the receiver at least comprising:

an OFDM demodulator, adapted to receive and demodulate the receiving signal with a channel response into a frequency-domain serial signal, wherein the frequency-domain serial signal comprises a plurality of data receiving symbols, a plurality of first training receiving symbols, and a plurality of second training receiving symbols;

wherein each of the data receiving symbol comprises a plurality of first data receiving signals corresponding to the first data sub-carriers, each of the first training receiving symbol comprises a plurality of first pilot receiving signals corresponding to the first pilot sub-carriers, and each of the second training receiving symbol comprises a plurality of second pilot receiving signals and a plurality of second data receiving signals, the second pilot receiving signals corresponding to the second pilot sub-carriers, the second data receiving signals corresponding to the second data sub-carriers; and wherein a number of the second pilot receiving signals is different from a number of the first pilot receiving signals, and every part of the second data receiving signals is placed between two of the second pilot receiving signals in the second training receiving symbol; and an inter-subcarrier interference cancellation unit, adapted to estimate a plurality of channel responses of the first and second data receiving signals by using the adjacent first pilot receiving signals of the first training receiving symbols and second pilot receiving signals of the second training receiving symbols, and restore the data receiving signals into the first and second data sub-carriers by using the channel responses.

13. The receiver according to claim 12, wherein the inter-subcarrier interference cancellation unit comprises:

a sub-carrier storing unit, adapted to store the frequency-domain serial signal;

a pilot sub-carrier extracting unit, adapted to extract the adjacent first pilot receiving signals and second pilot receiving signals from the sub-carrier storing unit;

a data sub-carrier extracting unit, adapted to extract the corresponding first data receiving signals located between the adjacent first training receiving symbol and second training receiving symbol, and the corresponding second data receiving signals located within the second training receiving symbol from the sub-carrier storing unit;

a polynomial coefficient estimating unit, adapted to estimate a plurality of polynomial coefficients by using the adjacent first pilot receiving signals and the second pilot receiving signals;

a data sub-carrier channel estimating unit, adapted to estimate the channel responses corresponding to the extracted first and second data receiving signals according to the polynomial coefficients; and an equalizer unit, adapted to restore the extracted first and second data receiving signals into the first and second data sub-carriers according to the channel responses.

14. The receiver according to claim 12, wherein the OFDM demodulator comprises:

a receiving filter, adapted to receive and filter the receiving signal with a channel response;

a serial to parallel converting unit (S/P converting unit), adapted to parallelize the filtered receiving signal into a plurality of parallel first time-domain receiving signals;

a guard interval removing unit, adapted to remove guard intervals of the first time-domain receiving signals to obtain a plurality of second time-domain receiving signals;

a fast Fourier transform (FFT) unit, adapted to transform the second time-domain receiving signals into a plurality of frequency-domain receiving signals in an FFT manner; and a parallel to serial converting unit (P/S converting unit), adapted to serialize the frequency-domain receiving signals into the frequency-domain serial signal.

15. The receiver according to claim 14, wherein the guard interval is a cyclic prefix or a cyclic post-fix.

* * * * *